(12) United States Patent
Nelson

(10) Patent No.: US 10,838,224 B1
(45) Date of Patent: Nov. 17, 2020

(54) VIEWER SUPPORT / SYSTEM: DEVICE AND METHODS OF MAKING AND USING THE DEVICE

(71) Applicant: Neal Nelson, South Elgin, IL (US)

(72) Inventor: Neal Nelson, South Elgin, IL (US)

(*) Notice: Subject to any disclaimer, the term of this patent is extended or adjusted under 35 U.S.C. 154(b) by 143 days.

(21) Appl. No.: 14/919,305

(22) Filed: Oct. 21, 2015

(51) Int. Cl.
*G02B 27/22* (2018.01)
*G02B 30/34* (2020.01)
*G02B 7/00* (2006.01)

(52) U.S. Cl.
CPC .............. *G02B 30/34* (2020.01); *G02B 7/002* (2013.01)

(58) Field of Classification Search
CPC .. G02B 27/022; G02B 27/04; G02B 27/2257; G02B 27/0176; G02B 27/028; G02B 27/02; G02B 27/01; G02B 27/017; G02B 27/0172; G02B 2027/0136; G02B 2027/0181; G02B 2027/0185; G02B 2027/0178; G02B 2027/0187; G09G 3/003; G09G 3/20; G09G 3/2085; G09G 3/2088; G09G 3/0354; G09G 5/00; G06F 3/012; G06F 3/0354; G06F 3/044; G06F 3/01; G06F 1/16; G06T 19/00

USPC ........ 359/480, 630, 631; 345/7, 8, 156, 161, 345/184, 620, 625, 633, 661; 348/36, 77, 348/207; 349/13

See application file for complete search history.

(56) References Cited

U.S. PATENT DOCUMENTS

| | | | | |
|---|---|---|---|---|
| 4,442,960 A | * | 4/1984 | Vetter | B62J 9/00 190/108 |
| 5,696,521 A | * | 12/1997 | Robinson | G02B 27/017 345/8 |
| 9,733,480 B2 | * | 8/2017 | Baek | G02B 27/0176 |
| 10,108,016 B2 | * | 10/2018 | Bosveld | A41D 20/00 |
| 2013/0336631 A1 | * | 12/2013 | Kura | H04N 13/30 386/230 |
| 2015/0234192 A1 | * | 8/2015 | Lyons | G02B 27/0172 345/8 |

* cited by examiner

*Primary Examiner* — Stephone B Allen
*Assistant Examiner* — Jyotsna V Dabbi
(74) *Attorney, Agent, or Firm* — Peter K. Trzyna, Esq.

(57) ABSTRACT

A stereoscopic viewer support system, including an article of manufacture, device, and methods of making and using the foregoing. There can be a receiver shaped to receive and suspend a stereoptic viewer, such that upon receiving the viewer and a stereoptic display device, the receiver plus the viewer plus the device collectively have a weight and the display device is positionable at eye level; and a head mount comprising a forehead length connected occipitally to a circumference adjuster, the head mount associated with the receiver such that, upon wearing the article and the viewer and the stereoptic display device, the weight is essentially balanced by force on the occipital length of the head mount.

27 Claims, 16 Drawing Sheets

VIEWER SUPPORT / SYSTEM: DEVICE AND METHODS OF MAKING AND USING THE DEVICE

I. SUMMARY

The following relates to a stereoptic display device, its support system, or both as apparatus, article of manufacture, and methods of making and using them.

II. BRIEF DESCRIPTION OF THE FIGURES

III. DETAILED DISCLOSURE OF EMBODIMENTS

Sometimes it is not what you see, but what you do not see, and the system discussed herein can be made so as to be devoid of things believed to have previously been thought necessary for stereoptic viewing device support systems. For example, the instant stereoptic viewing device support system can be made so that it is not configured for being handheld in place in front of ones eyes, such as by a handle. As another example, the instant stereoptic viewing device support system can be made so that it is not elastic band-squeezed against one's face. As a further example, the instant stereoptic viewing device support system can be made so that it is not torquing away from one's face, essentially off-balanced on the wearer's face. As yet another example, the instant stereoptic viewing device support system can be made so that it is not a helmet.

Figure 1:
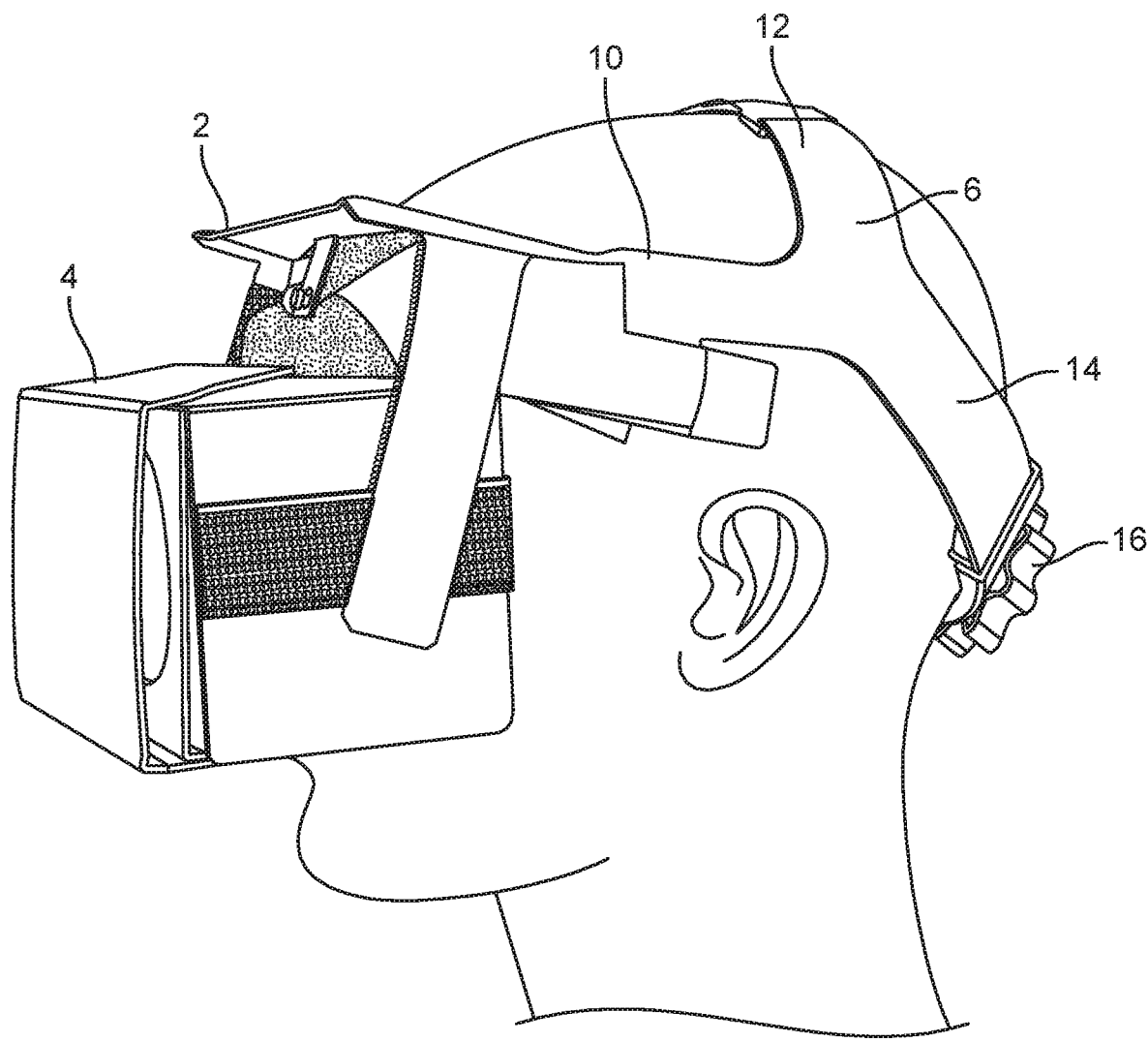
FIG. 1 is an illustration of an embodiment in perspective.

As a departure from any or all of these, a stereoptic viewing device support system can instead be made to suspend the viewer device, and if so desired, be adjustable for proper placement of the viewer device when worn. Illustratively then, consider FIG. 1 as an embodiment of the viewer and support in perspective.

The stereoptic viewing device support system can include a receiver 2 of a stereoptic viewer 4 and a head mount 6 to form an assembly 8 (assembly 8 refers to items 2, 4, 6 in FIG. 1), wherein a means for suspending is defined as receiver 2 combined with head mount 6. The viewer 4 is shaped and sized to accept and hold in place a stereoptic display device 26 (not shown in FIG. 1, but see FIG. 3), such as a cellular "smart" phone. The head mount 6 section supports the assembly 8 by fitting over a wearer's head and positionable with respect to the head.

Figure 2:
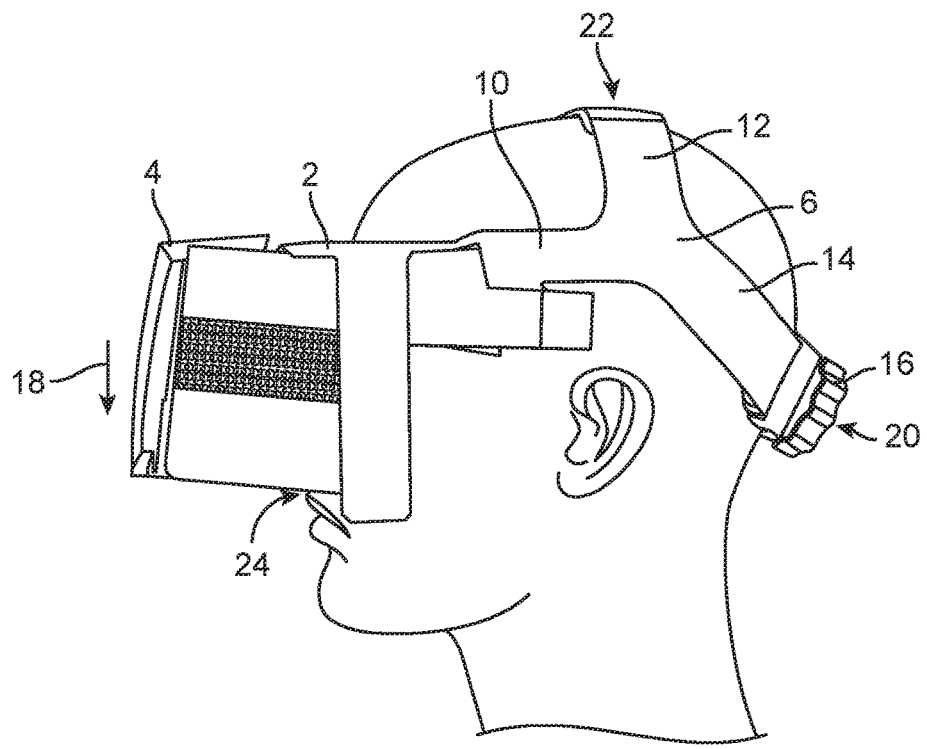
FIG. 2 is an illustration of an embodiment and indications of weight and torque.
Figure 3:
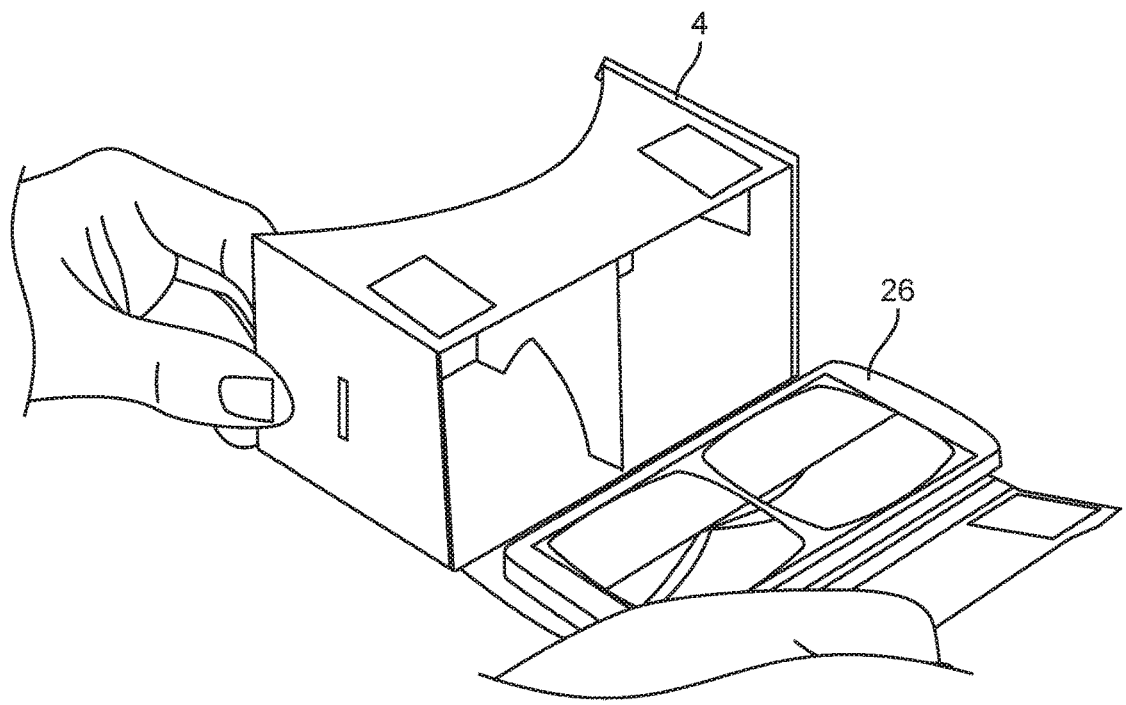
FIG. 3 is an illustration of an embodiment of a stereoptic viewing device in perspective.

Accordingly, as illustrated in FIG. 2 there can be a receiver 2 shaped to receive and suspend a stereoptic viewer 4, such that upon receiving the viewer 4 and a stereoptic display device 26 (an example of which is shown in FIG. 3), the receiver 2 plus the viewer 4 plus the device 26 collectively have a weight and the display device 26 is positionable at eye level. The head mount 6 comprises a forehead length 10, combined with, in some but not all cases, a parietal length 12 and, connected by an occipital length 14 to a circumference adjuster 16. The head mount 6 associated with the receiver 2 such that, upon wearing the assembly 8 and the viewer 4 and the stereoptic display device 26, the weight (illustrated as 18) is essentially balanced by (force illustrated as 20) on the occipital length 14 of the head mount 6, and torque produced from the weight 18 is essentially balanced by force (illustrated as 20) on the occipital length 14 of the head mount 6.

In another embodiment, the weight 18 is essentially balanced by frictional force (not illustrated in FIG. 2) on the forehead length 10 of the head mount 6, and torque from the weight 18 is essentially balanced by force 20 on the occipital length 14 of the head mount 6.

In an additional embodiment, the head mount 6 has a second weight (not illustrated in FIG. 2) associated with the receiver 2 such that, upon wearing the assembly 8 and the viewer 4 and the stereoptic display device 26, torque from the first weight 18 is primarily countervailed by torque from the second weight and tension of the head mount 6.

From yet another perspective, the head mount 6 can be associated with the receiver 2 such that, upon wearing the assembly 8 and the viewer 4 and the stereoptic display device 26, torque (not illustrated in FIG. 2) is not substantially provided by an outward force (not illustrated in FIG. 2) of a face pushing on a lower edge 24 of the viewer 4.

In still another embodiment, the head mount 6 can be associated with the receiver 2 such that, upon wearing the assembly 8 and the viewer 4 and the stereoptic display device 26, torque (not illustrated in FIG. 2) is not substantially provided by a friction force (not illustrated in FIG. 2) of a face or forehead in contact with the viewer 4 or the head mount 6.

Now more particularly, consider one of the many kinds of implementations of a viewer 4 so that it is adapted for use in the assembly 8 in connection with one of the embodiments of the support system 6. In the FIG. 3 embodiment, the viewer 4 is illustratively made of cardboard. The viewer 4 is sized and shaped to accommodate the display device 26, herein illustratively represented as a "smart" cellular phone, however, the viewer 4 and display need not be so limited, and the display device 26 can in some cases extend to any device which generates left eye and right eye images as a sterioptic display.

Figure 4:
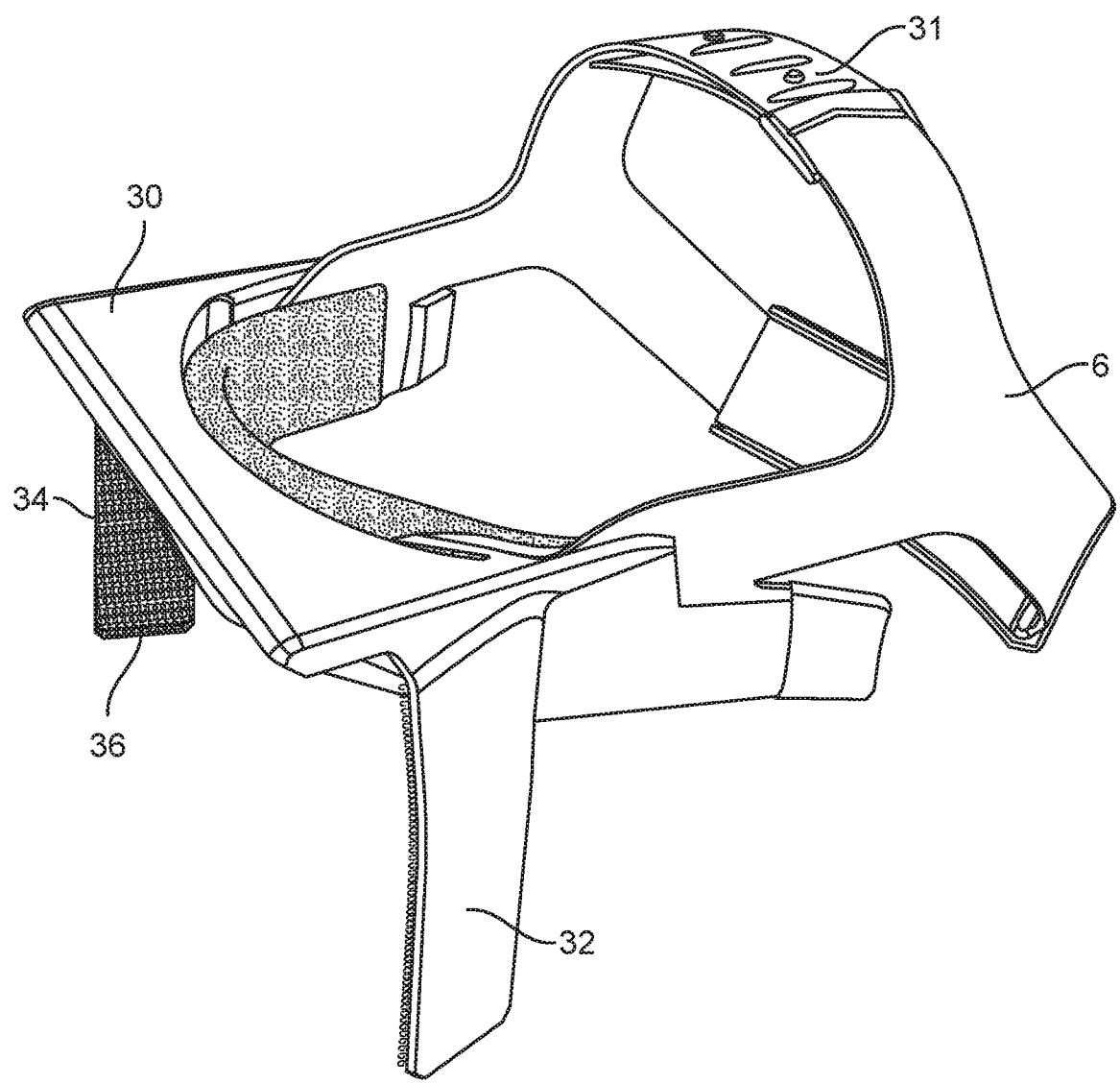
FIG. 4 illustrates a perspective view showing a front and side of a stereoptic viewing device support system.

FIG. 4 illustrates an embodiment in which the front and side of a stereoptic viewing device support system, wherein the receiver 2 may, if so desired, include a brace 30. Brace 30 may include a first plane 32 and a second plane 34, and which may but need not be integral with brace 30. The first plane 32 and second plane 34 can have inwardly facing grippers, namely gripper 36 and 38 (not shown in FIG. 4, but see FIG. 9). Grippers 36 and 38 can be any grippers that grip viewer 4 in an attachably detachable manner, as discussed below.

Figure 5:
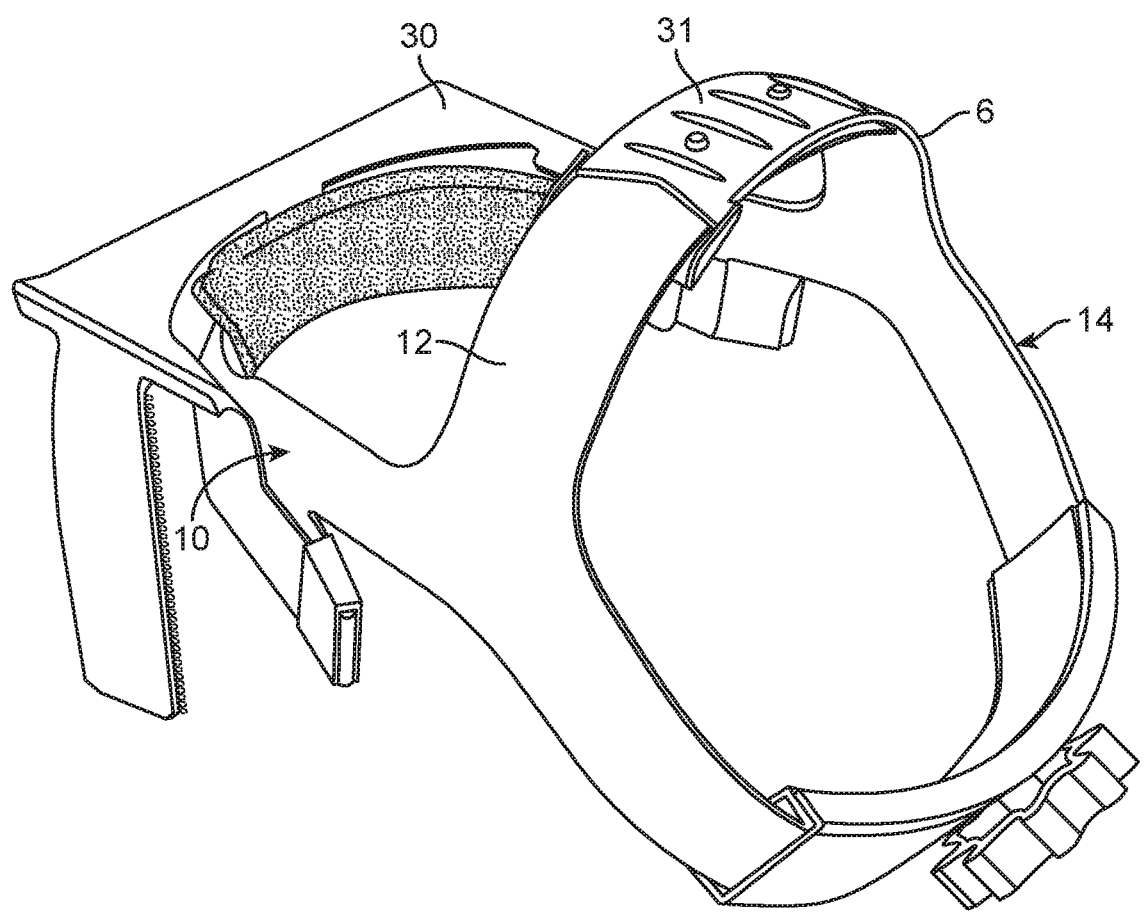
FIG. 5 illustrates a perspective view showing the top and back of a stereoptic viewing device support system.

FIG. 5 illustrates a perspective view showing the top and back of an embodiment of a stereoptic viewing device support system, including the head mount section 6, in which lengths 10, 12, and 14 can be bands constructed from a non-elastic, semi-rigid material such as plastic. To accommodate wearers having different head sizes, the parietal headband 12 can have a parietal length adjuster 16, and the occipital length 14 can have an occipital length adjuster 31. The occipital length 14 can be angled to allow the occipital length 14 to rest on, close to, or just below the occipital bone of the wearer's skull—in whichever implementation is preferred.

Figure 6:
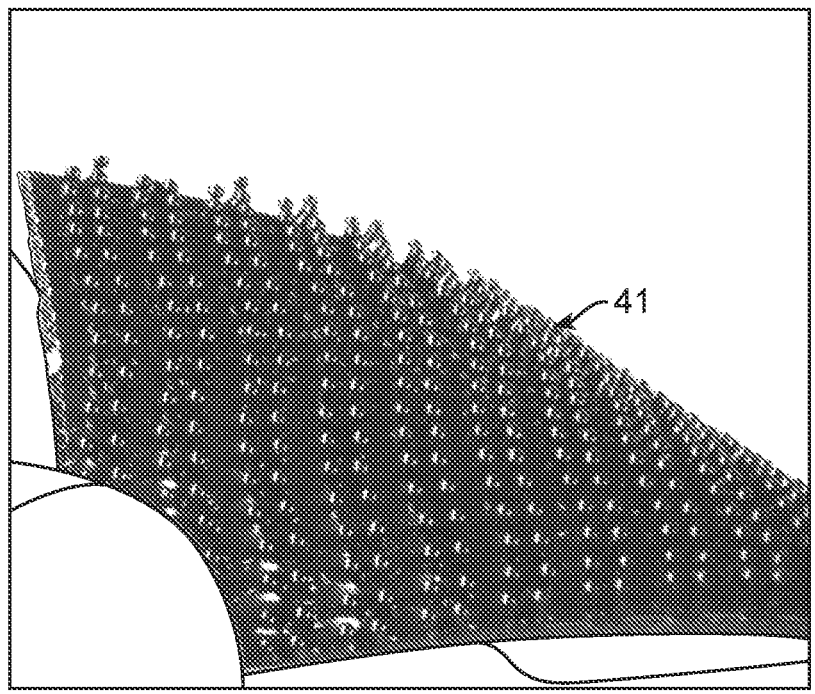
FIG. 6 is an illustration that shows the "gripper" surface of one type of detachable attachment gripper strip.
Figure 10A:
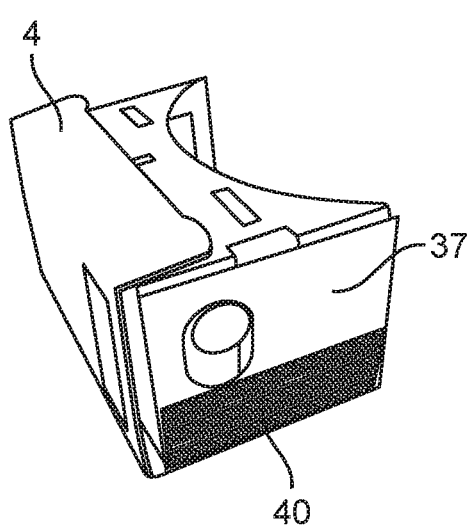
FIGS. 10A and 10B is a pair of perspective images that illustrate how a stereoptic viewing device made of cardboard can have detachable attachment strips affixed to its the sides.
Figure 10B:
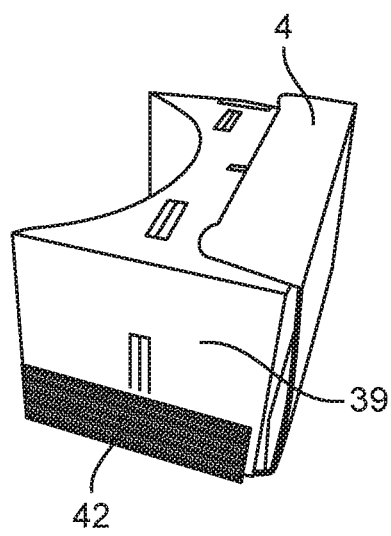

FIG. 6 illustrates the grippers 36 and 38 affixed to the planes 32 and 34 of the receiver 2. See FIGS. 10A and 10B to illustrate that the grippers 36 and 38 of planes 32 and 34 can be such as to mate with compatible detachable attachment grippers 40 and 42 affixed a first plane 37 and a second plane 39 of a stereoptic viewer 4. Use of such grippers 40 and 42 affixed (FIGS. 10A and 10B) to a first plane 37 and a second plane 39 can be added to virtually any stereoptic viewer 4 to adapt the viewer 4 to be combined with the grippers 36 and 38 of first plane 32 and second plane 34 of receiver 2.

Figure 7:
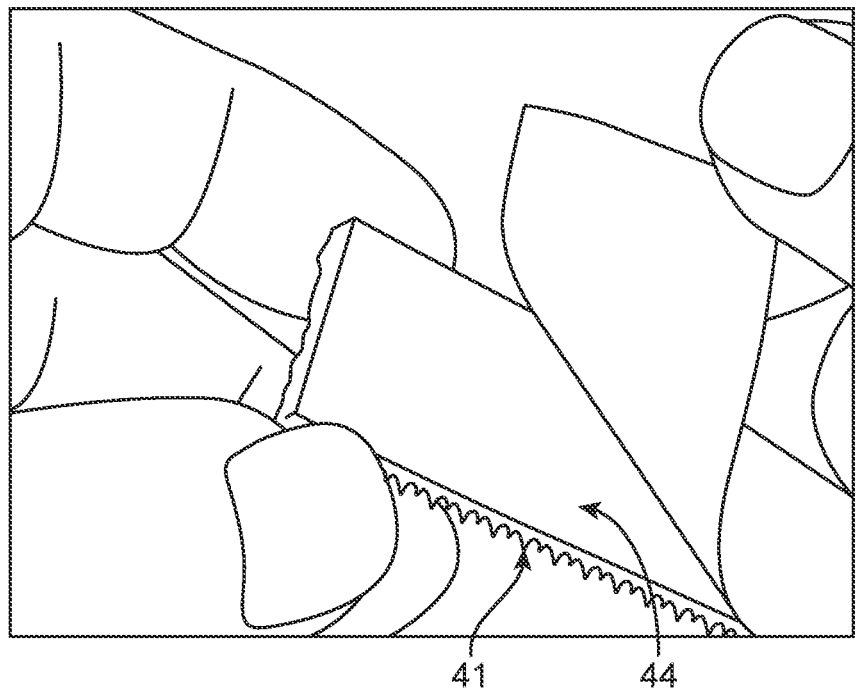
FIG. 7 is an illustration that shows how some detachable attachment gripper material has "peel and stick" adhesive on a back side.

One example of the types of materials for the grippers 36, 38, 40, and 42 is shown in FIG. 7 as having a "peel and stick" adhesive 44 on one side and, on the opposite side 41, the "gripper side." The grippers 36, 38, 40, and 42 can, for example, be made from the Dual Lock™ family from 3-M™. Use of such gripers 36, 38, 40, and 42 allows modifying a viewer 4 to provide the detachable attachment capability subsequent to its original manufacture. Compare FIG. 3 and FIGS. 10A and 10B. An alternative is to incorporate gripers 40 and 42 into the stereoptic viewer 4 according to the original manufacturing design, i.e., at the time of their original manufacture.

Figures 8A, 8B:
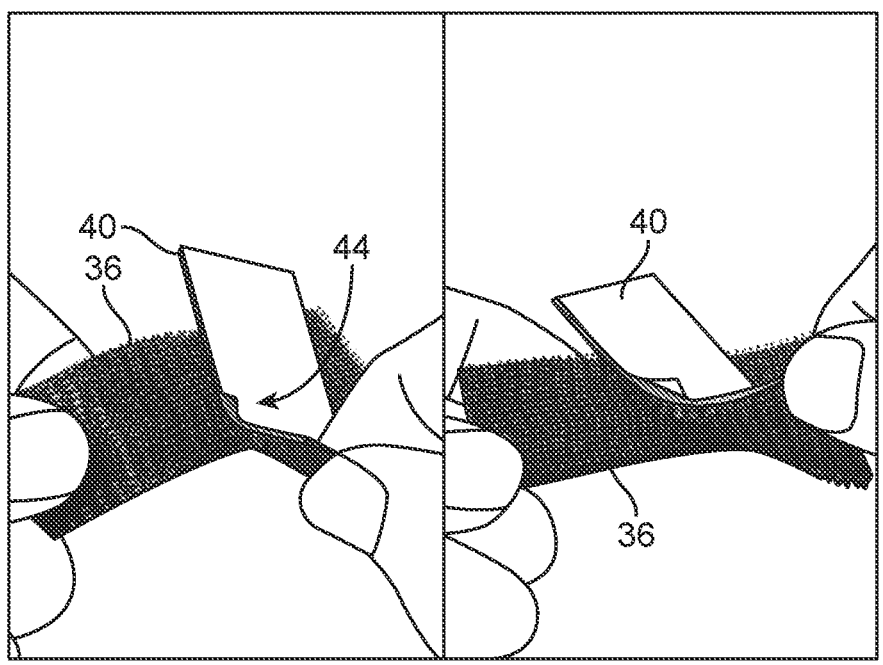
FIGS. 8A and 8B is a pair of images that illustrate how two gripper strips of detachable attachment material can be mated at different orientations or angles to each other.
Figure 9:
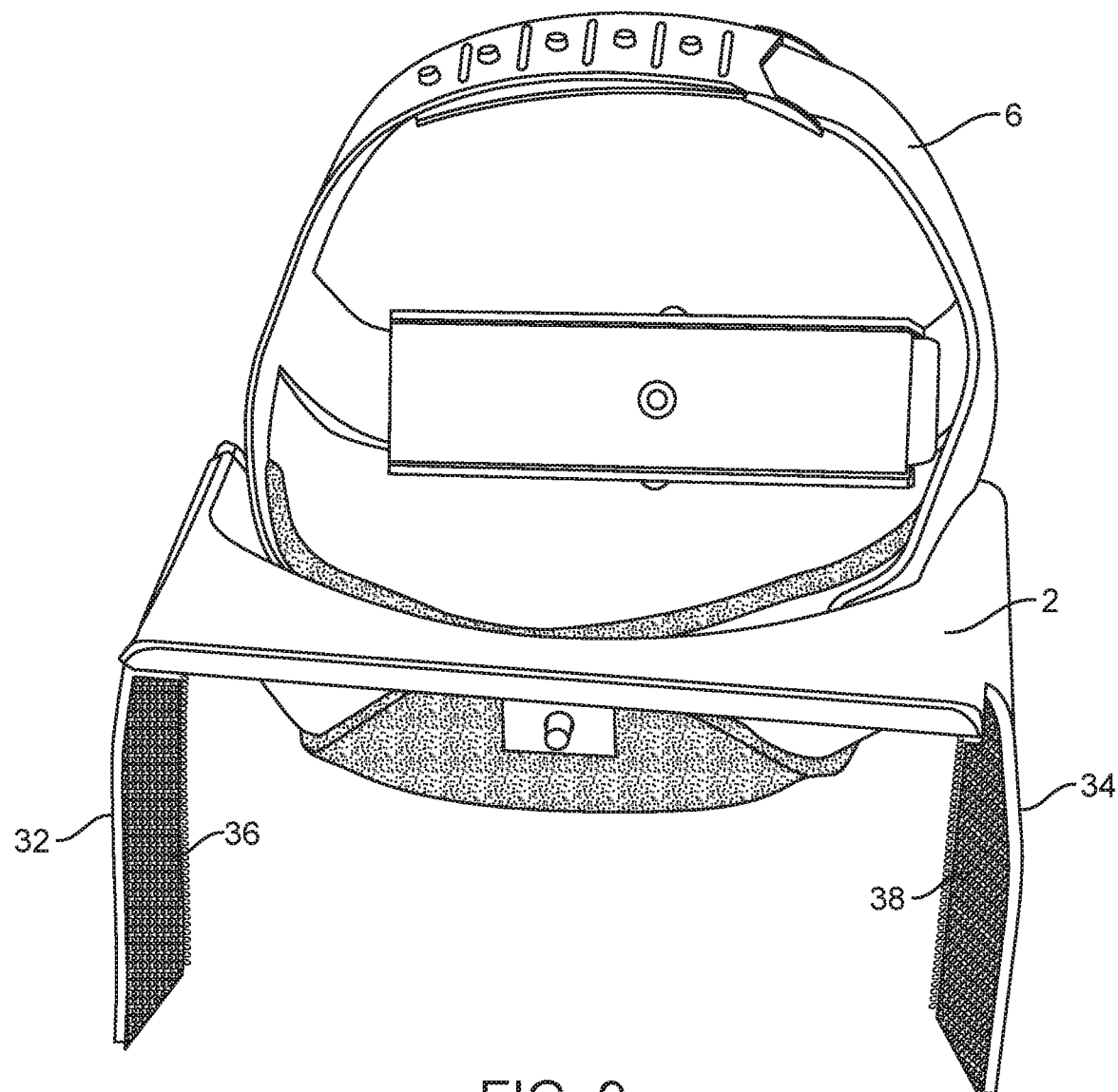
FIG. 9 is an image that illustrates how the inner vertical surfaces of the of the stereoptic viewing device support system receiver have detachable attachment gripper properties.

FIGS. 8A and 8B illustrate how two pieces of the detachable attachment material 36, 38, 40, and 44 can mate with one another with various different orientations. This capability allows significant flexibility in how the stereoptic viewer 4 can be mounted in the support system receiver 2. FIG. 9 shows grippers 36 and 38 located on the receiver 2.

Figure 11A:
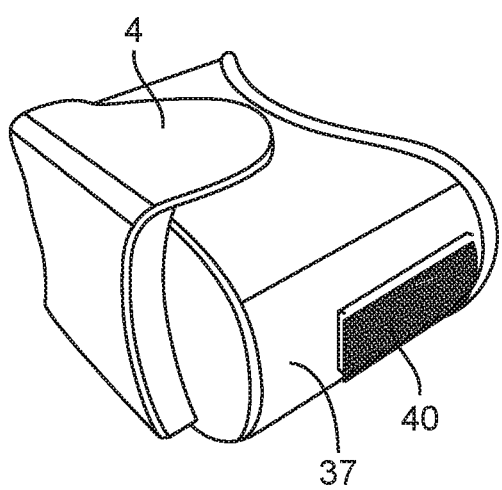
FIGS. 11A and 11B is a pair of perspective images that illustrate how a stereoptic viewing device made of a composite material can have detachable attachment strips affixed to its the sides.
Figure 11B:
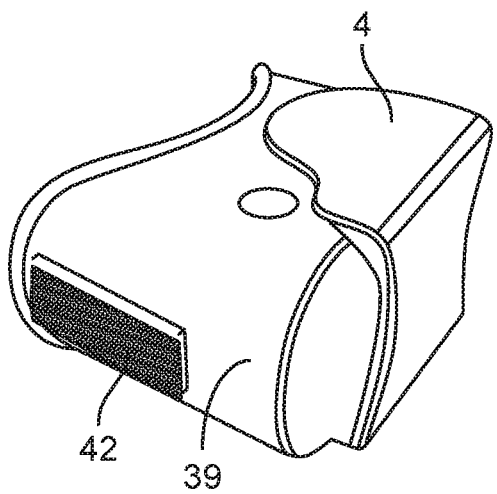
Figure 12A:
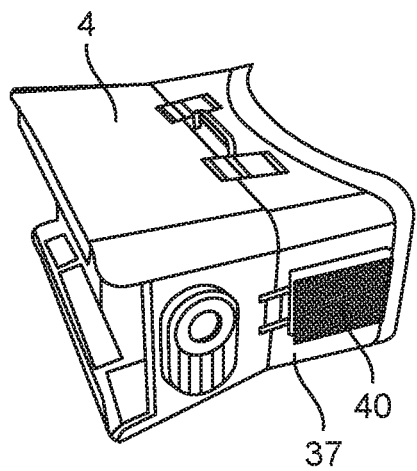
FIGS. 12A and 12B is a pair of perspective images that illustrate how a stereoptic viewing device made of plastic can have detachable attachment strips affixed to its the sides.
Figure 12B:
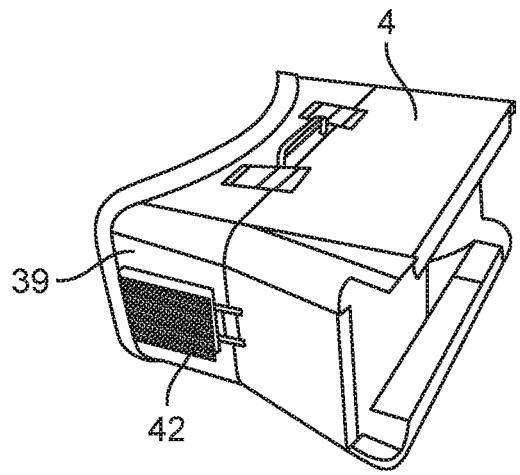
Figure 13:
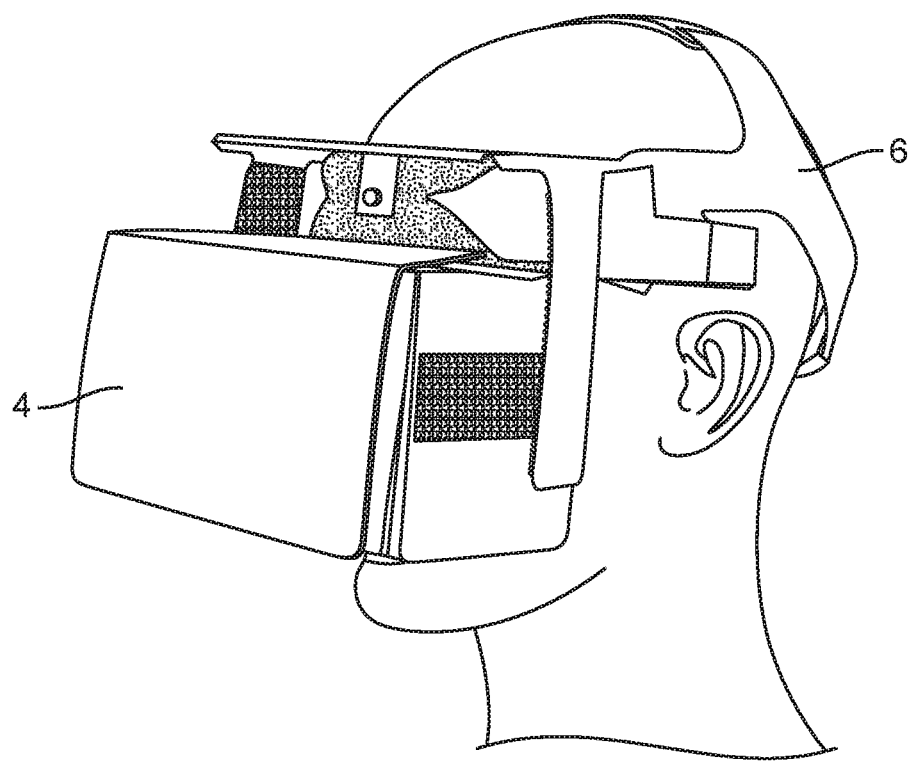
FIG. 13 illustrates how a stereoptic viewing device made of cardboard can be supported by a stereoptic viewing device support system.
Figure 14:
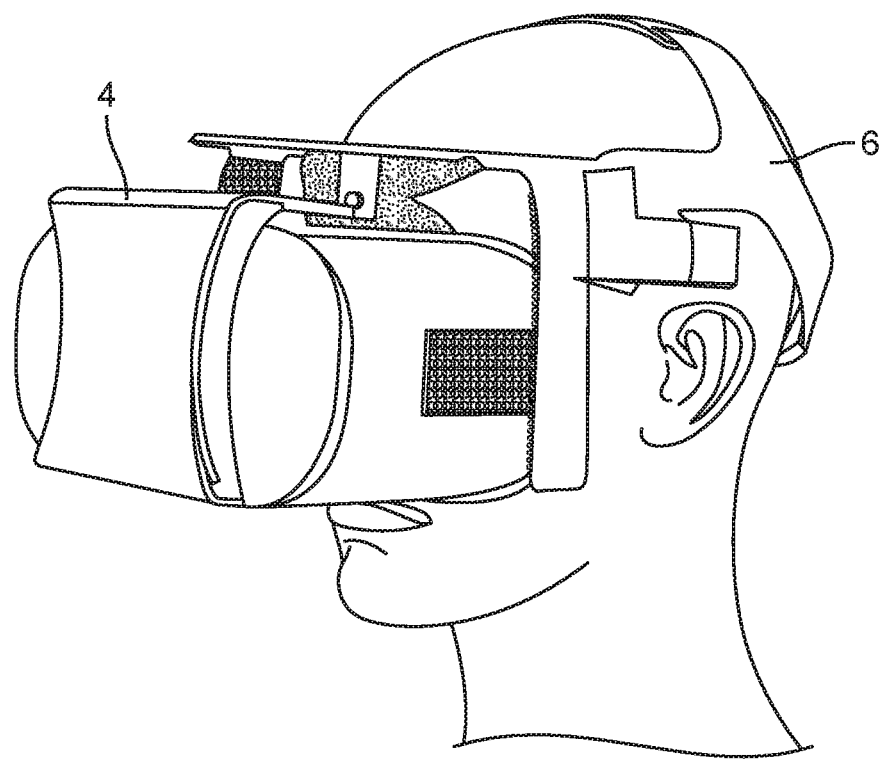
FIG. 14 illustrates how a stereoptic viewing device made of a composite material can be supported by a stereoptic viewing device support system.
Figure 15:
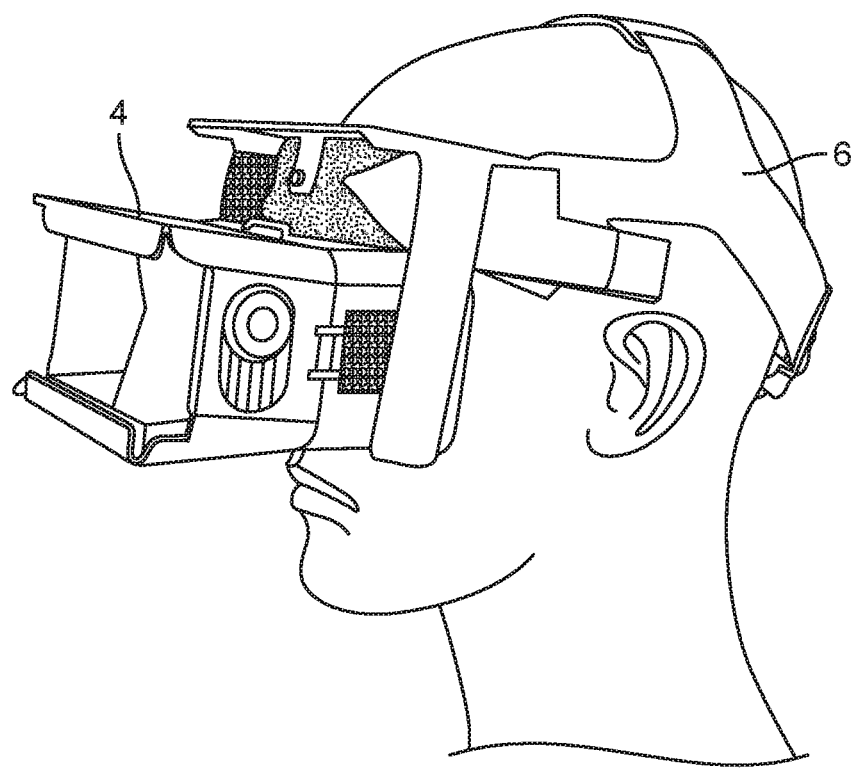
FIG. 15 illustrates how a stereoptic viewing device made of plastic can be supported by a stereoptic viewing device support system.

Use of such gripers 36, 38, 40, and 42 can enable the receiver 2 to provide support to different viewer 4 embodiments. Examples are shown for a stereoptic viewer made of cardboard (FIGS. 10A and 10B), a stereoptic viewer 4 made of a composite material (FIGS. 11A and 11B) and a stereoptic viewer 4 made of plastic (FIGS. 12A and 12B). Viewers 4 can, for example, that can be adapted according to the teachings herein include the Colorcross™ a24, Iamcardboard™ V2.0, Knoxlabs™ V2, Dodocase™ G2™, Samsung Gear™, and Oculus Rift™.

Accordingly a given stereoptic viewer support system can be used to interchangeably support different types of stereoptic viewers 4 such as a stereoptic viewer 4 made of cardboard (FIGS. 10A and 10B), a stereoptic viewer 4 made of a composite material (FIGS. 11A and 11B), and a stereoptic viewer 4 made of plastic (FIGS. 12A and 12B).

Figure 16A:
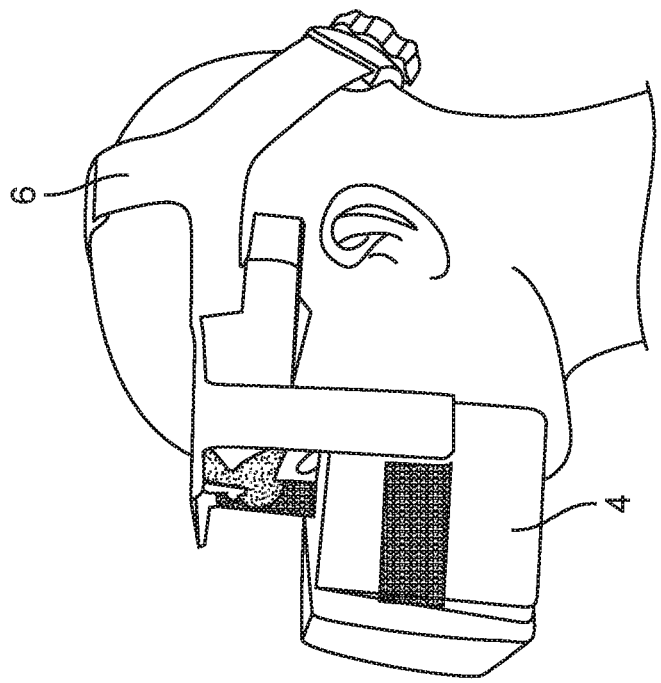
FIGS. 16A and 16B is a pair of images that illustrate how a stereoptic viewing device can be positioned in different vertical positions within a stereoptic viewing device support system.
Figure 16B:
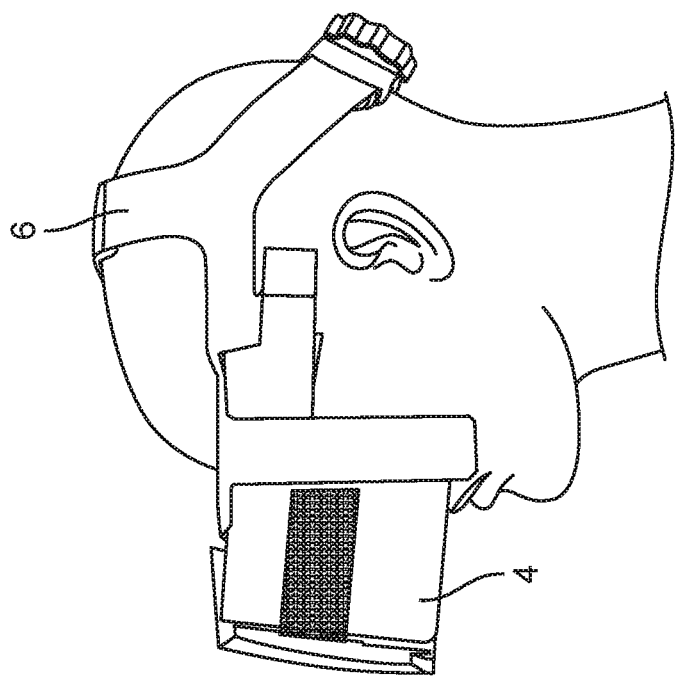
Figure 17B:
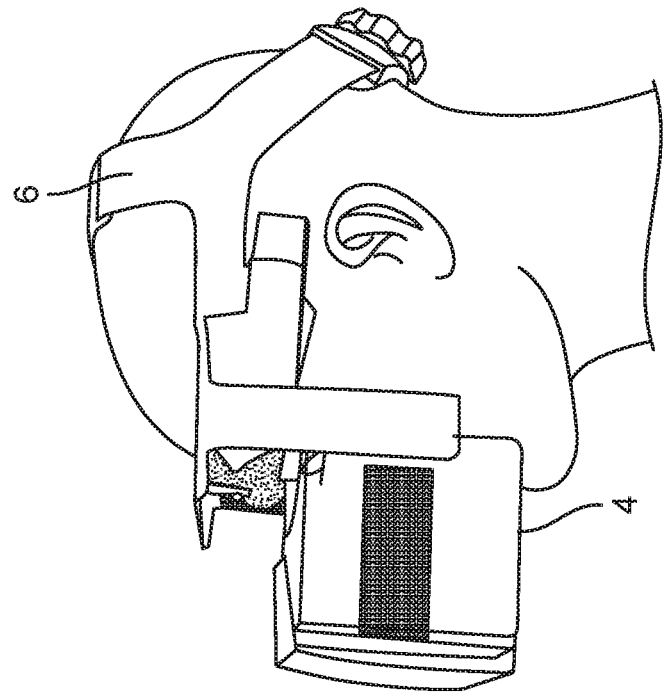
FIGS. 17A and 17B is a pair of images that illustrate how a stereoptic viewing device can be positioned either closer to, or farther away from, the wearer's face within a stereoptic viewing device support system.
Figure 17A:
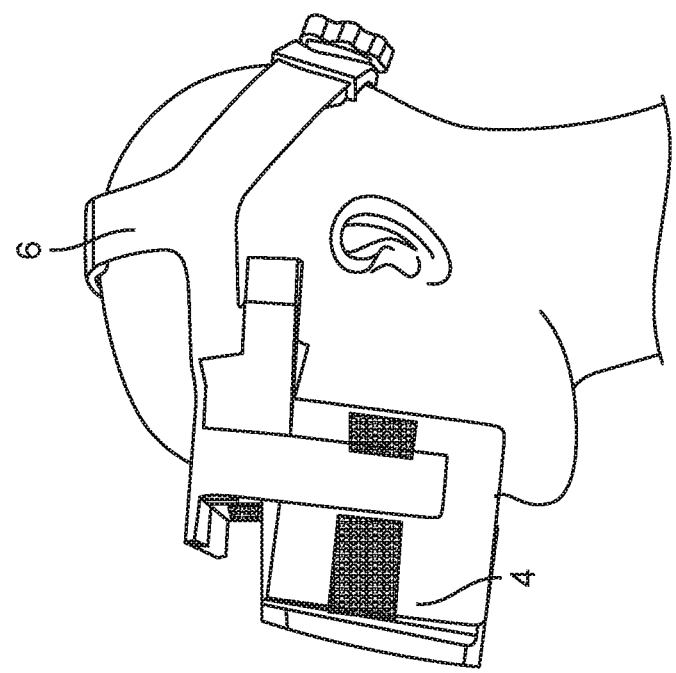
Figure 18A:
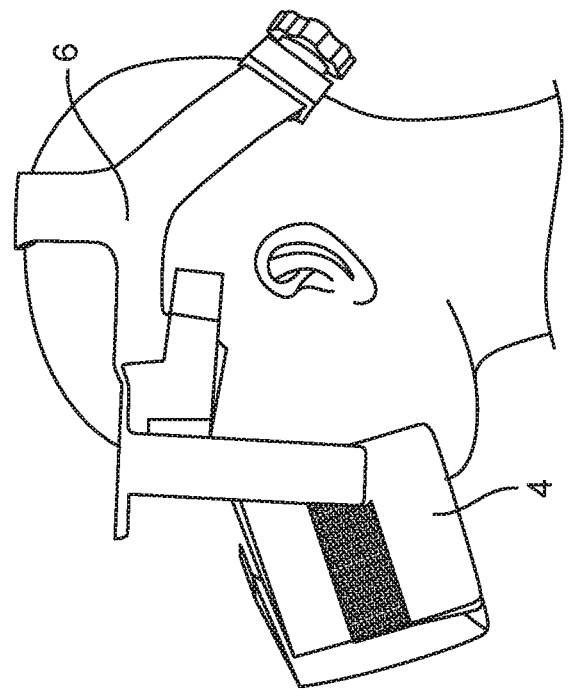
FIGS. 18A and 18B is a pair of images that illustrate how a stereoptic viewing device can be positioned at different angles within a stereoptic viewing device support system.
Figure 18B:
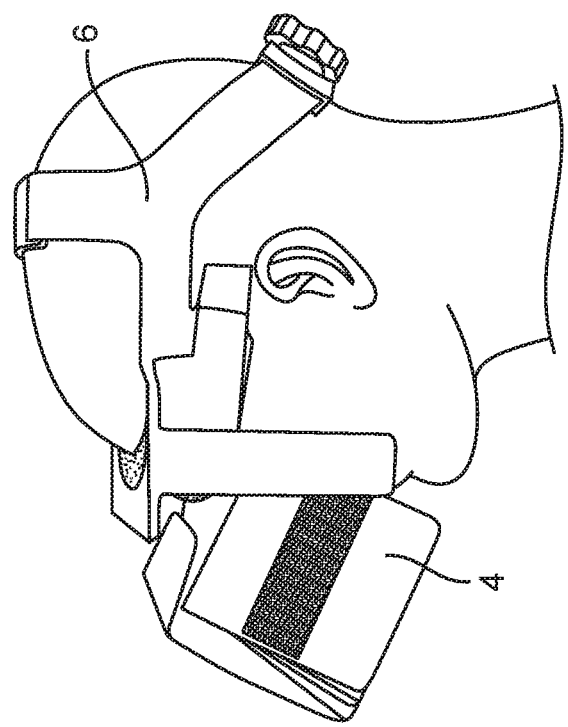

The ability of the detachable attachment gripper surfaces 36, 38, 40, and 42 to mate in various different orientations (FIG. 1 e.g.) also permits the stereoptic viewer support system to provide support for a steroptic viewer 26 in a position that is most comfortable for the wearer. Examples of this can be seen where the stereoptic viewer 4 is mounted higher or lower in the support system (FIGS. 16A and 16B), closer or farther away from the face (FIGS. 17A and 17B), and at different angles (FIGS. 18A and 18B).

It should be appreciated that the physics of one embodiment can, but need not always, proscribe another embodiment. So illustratively referencing the method of making embodiments for the viewer support/system, there can be a process that includes combining (A) a receiver 2 shaped to receive and suspend a stereoptic viewer 4, such that upon receiving the viewer 4 and a stereoptic display device 26, the receiver 2 plus the viewer 4 plus the device 26 collectively have a weight, and the display device 26 is positionable at eye level, with (B) a head mount 6 which meets the specifications of one or more of the following: (1) means for suspending the viewer 4 including a head mount 6 comprising a forehead length 10 connected occipitally to a circumference adjuster 16, the head mount 6 being associated with the receiver 2 such that, upon wearing the article, the viewer 4 and the stereoptic display device 26 are positioned adjacent to a facial location, (2) a head mount 6 comprising a forehead length 10, combined with a parietal length 12 and connected occipitally to a circumference adjuster 16, the head mount 6 associated with the receiver 2 such that, upon wearing the article and the viewer 4 and the stereoptic display device 26, the weight is essentially balanced by force on the parietal length 12 of the head mount 6 and torque from the weight is essentially balanced by force on the occipital length 14 of the head mount 6, (3) where the receiver 2 plus the viewer 4 plus the display device 26 collectively have a weight and the display device 26 is positionable at eye level, a head mount 6 comprising a forehead length 10, combined with a parietal length 12 and connected occipitally to a circumference adjuster 16, the head mount 6 associated with the receiver 2 such that the weight is essentially balanced by frictional force on the forehead length 10 of the head mount 6 and torque from the weight is essentially balanced by force on the occipital length 14 of the head mount 6, (4) where the receiver 2 plus the viewer 4 plus the display device 26 collectively have a first weight and the display device 26 is positionable at eye level, a head mount 6 having a second weight and being associated with the receiver 2 such that, upon wearing the article and the viewer 4 and the stereoptic display device 26, torque from the first weight is primarily countervailled by torque from the second weight and tension of the head mount 26, (5) a head mount 6 comprising a forehead length 10, combined with a parietal length 12 and connected occipitally to a circumference adjuster 16, the head mount 6 being associated with the receiver 2 such that, upon wearing the article and the viewer 4 and the stereoptic display device 26, torque is not substantially provided by an outward facial force pushing on a lower edge of the viewer 4, and (6) a head mount 6 comprising a forehead length 10 connected occipitally to a circumference adjuster 16, the head mount 6 being associated with the receiver 2 such that, upon wearing the article and the viewer 4 and the stereoptic display device 26, torque is not substantially provided by a friction force of a face or forehead in contact with the viewer 4 and/or the head mount 6.

If so desired (again illustratively referencing the method of making), the process can be carried out so that the combining is carried out with the receiver 2 including a first plane 32 and a second plane 34, each of the planes 32 and 34 extending from adjacent to the forehead length 10; and further comprising a first gripper 36 having an adhesive surface 44 and an opposite surface 41; and a second gripper 40 having an adhesive surface 44 and an opposite surface 41, wherein the opposite surfaces are detachably attachable, such that after joining the adhesive surface 44 of the first gripper 36 to the first plane 32, and after joining the adhesive surface 44 of the second gripper 40 to a first plane 37 of the viewer 2, the opposite surfaces 41 of the grippers 36 and 40 intersect so as to detachably attach the viewer 2 to the receiver 6 adjacent to the first planes 32 and 37; and a third gripper 38 having an adhesive surface 44 and an opposite surface 41; and a fourth gripper 42 having an adhesive surface 44 and an opposite surface 41, wherein the opposite surfaces 41 of the third and the fourth grippers 38 and 42 are detachably attachable, such that after joining the adhesive surface 44 of the third gripper 38 to the second plane 34 of the receiver 2, and after joining the adhesive surface 44 of the fourth gripper 42 to a second plane 39 of the viewer 4, the opposite surfaces 41 of the third and the fourth grippers 38 and 42 intersect so as to detachably attach the viewer 2 to the receiver 4, adjacent to the second planes 34 and 39, whereby the viewer 4 is positionable in two dimensions, and if so desired, rotatably mounted.

Other modifications and implementations can, but need not, be as further disclosed herein, and thus include products produced by the process. Additionally, such products, articles, and apparatus can be used in a process by combining the receiver 2 and the head mount 6 and the viewer 4, which includes adapting the viewer 4 to be suspended by the receiver 2 in accordance with the disclosure herein, for example, by applying one or more of the grippers (see, representatively FIG. 6) to the viewer 4, employing protrusions and slots so that the viewer is slidably mountable and then secured by a step in the slots so that the viewer 4 drops into an engagement with the receiver 2, etc., to produce a combination of the receiver 2, the head mount 6, and the viewer 4 in an assembly 8. This process can be carried forward, if desired, by combining the stereoptic display device 26 within the viewer 4.

In sum, with respect to the description herein, numerous specific details are provided, such as examples of components and/or methods, to provide a thorough teaching and understanding of embodiments of the present invention. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Similarly, embodiments can be implemented in many forms, and based on the disclosure and teachings provided herein, a person of ordinary skill in the art will appreciate other ways and/or methods to implement an equivalent. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as otherwise operable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the disclosure herein provided.

I claim:

1. An article of manufacture to receive and suspend a stereoptic viewer assembly, the article including:
   a receiver comprising a brace configured to receive and suspend a stereoptic viewer that is detachably attached and adjustably positionable with respect to the receiver and configured such that upon wearing the stereoptic viewer and a stereoptic display device, the brace extends across a forehead transversely; and
   a head mount connected to the receiver, the head mount comprising a forehead length structured such that upon wearing the head mount, the forehead length extends across a forehead transversely, the forehead length connected occipitally to a circumference adjuster.

2. The article of claim 1, further comprising grippers on sides of the stereoptic viewer, each said gripper intermediate the receiver and the stereoptic viewer, each said gripper configured to enable the stereoptic viewer to be adjustably positionable higher or lower, and closer or farther, with respect to the receiver, and thereafter to enable affixing the stereoptic viewer to the receiver.

3. The article of claim 1, wherein the stereoptic viewer is sized and shaped to accommodate a cellular phone as the stereoptic display device.

4. A process of making a viewer support system to receive and suspend a stereoptic viewer assembly, the method including:
  combining a receiver configured to receive and suspend a stereoptic viewer that is detachably attached and adjustably positionable with respect to the receiver, such that upon receiving the stereoptic viewer and a stereoptic display device, the receiver plus the stereoptic viewer plus the stereoptic display device collectively have a weight, wherein the receiver is configured to interchangeably support different types of stereoptic viewers, with a head mount that meets specifications of one or more of:
  (1) means for suspending the stereoptic viewer including a head mount comprising a forehead length structured such that upon wearing the head mount, the forehead length extends across a forehead transversely, the forehead length connected occipitally to a circumference adjuster, the head mount being associated with the receiver such that, upon wearing the article and the stereoptic viewer and the stereoptic display device, are positioned adjacent to a facial position,
  (2) a head mount comprising a forehead length structured such that upon wearing the head mount, the forehead length extends across a forehead transversely, the forehead length combined with a parietal length and connected occipitally to a circumference adjuster, the head mount associated with the receiver such that, upon wearing the article and the stereoptic viewer and the stereoptic display device, the weight is essentially balanced by force on the parietal length of the head mount and torque from the weight is essentially balanced by force on the occipital length of the head mount, or
  (3) a head mount comprising a forehead length structured such that upon wearing the head mount, the forehead length extends across a forehead transversely, the forehead length combined with a parietal length and connected occipitally to a circumference adjuster, the head mount associated with the receiver such that the weight is essentially balanced by frictional force on the forehead length of the head mount and torque from the weight is essentially balanced by force on the occipital length of the head mount,
  (4) a head mount comprising a forehead length structured such that upon wearing the head mount, the forehead length extends across a forehead transversely, the forehead length combined with a parietal length and connected occipitally to a circumference adjuster, the head mount having a second weight and being associated with the receiver such that, upon wearing the article and the stereoptic viewer and the stereoptic display device, torque from the first weight is primarily countervailled by torque from the second weight and tension of the head mount,
  (5) a head mount comprising a forehead length structured such that upon wearing the head mount, the forehead length extends across a forehead transversely, the forehead length combined with a parietal length and connected occipitally to a circumference adjuster, the head mount being associated with the receiver such that, upon wearing the article and the stereoptic viewer and the stereoptic display device, torque is not substantially provided by an outward force of a face pushing on a lower edge of the stereoptic viewer, and
  (6) a head mount comprising a forehead length connected occipitally to a circumference adjuster, the head mount comprising a forehead length structured such that upon wearing the head mount, the forehead length extends across a forehead transversely, the head mount being associated with the receiver such that, upon wearing the article and the stereoptic viewer and the stereoptic display device, torque is not substantially provided by a friction force of a face or forehead in contact with the stereoptic viewer or the head mount.

5. An article of manufacture to receive and suspend a stereoptic viewer assembly, the article including:
  a receiver configured to receive and suspend a stereoptic viewer that is detachably attached and adjustably positionable with respect to the receiver and configured such that upon receiving the stereoptic viewer and a stereoptic display device, the receiver plus the viewer plus the device collectively have a weight and the display device is positionable at eye level; and
  a head mount comprising a forehead length structured such that upon wearing the head mount, the forehead length extends across a forehead transversely, the forehead length combined with a parietal length and connected occipitally to a circumference adjuster, the head mount associated with the receiver such that, upon wearing the article and the viewer and the stereoptic display device, the weight is essentially balanced by force on the parietal length of the head mount and torque from the weight is essentially balanced by force on the occipital length of the head mount.

6. The article of claim 5, wherein the receiver is configured to interchangeably support different types of stereoptic viewers.

7. The article of claim 5, further comprising grippers on sides of the stereoptic viewer, each said gripper intermediate the receiver and thestereoptic viewer, each said gripper configured to enable the stereoptic viewer to be adjustably positionable higher or lower, and closer or farther, with respect to the receiver, and thereafter to enable affixing the stereoptic viewer to the receiver.

8. The article of claim 5, wherein the stereoptic viewer is sized and shaped to accommodate a cellular phone as the stereoptic display device.

9. An article of manufacture to receive and suspend a stereoptic viewer that is detachably attached and adjustably positionable with respect to the receiver, assembly, the article including:
  a receiver configured to suspend a stereoptic viewer, such that upon receiving the stereoptic viewer and a stereoptic display device, the receiver plus the stereoptic viewer plus the stereoptic display device collectively have a weight and the display device is positionable at eye level; and
  a head mount comprising a forehead length structured such that upon wearing the head mount, the forehead length extends across a forehead transversely, the forehead length combined with a parietal length and connected occipitally to a circumference adjuster, the head mount associated with the receiver such that the weight is essentially balanced by frictional force on the forehead length of the head mount and torque from the weight is essentially balanced by force on an occipital length of the head mount.

10. The article of claim 9, further comprising grippers on sides of the stereoptic viewer, each said gripper intermediate the receiver and the stereoptic viewer, each said gripper configured to enable the stereoptic viewer to be adjustably positionable higher or lower, and closer or farther, with respect to the receiver, and thereafter to enable affixing the stereoptic viewer to the receiver.

11. The article of claim 9, wherein the stereoptic viewer is sized and shaped to accommodate a cellular phone as the stereoptic display device.

12. An article of manufacture to receive and suspend a stereoptic viewer assembly, the article including:
  a receiver configured to suspend a stereoptic viewer that is detachably attached and adjustably positionable with respect to the receiver, such that upon receiving the viewer and a stereoptic display device, the receiver plus the viewer plus the display device collectively have a first weight and the display device is positionable at eye level; and
  a head mount comprising a forehead length structured such that upon wearing the head mount, the forehead length extends across a forehead transversely, the forehead length connected occipitally to a circumference adjuster the head mount having a second weight and being associated with the receiver such that, upon wearing the article and the viewer and the stereoptic display device, torque from the first weight is primarily countervailed by torque from the second weight and tension of the head mount.

13. The article of claim 12, further comprising grippers on sides of the stereoptic viewer, each said gripper intermediate the receiver and the stereoptic viewer, each said gripper configured to enable the stereoptic viewer to be adjustably positionable higher or lower, and closer or farther, with respect to the receiver, and thereafter to enable affixing the stereoptic viewer to the receiver.

14. The article of claim 12, wherein the stereoptic viewer is sized and shaped to accommodate a cellular phone as the stereoptic display device.

15. An article of manufacture to receive and suspend a stereoptic viewer, the article including:
  a receiver shaped to suspend a stereoptic viewer that is detachably attached and adjustably positionable with respect to the receiver, such that upon receiving the viewer and a stereoptic display device, the receiver plus the viewer plus the display device collectively have a weight; and
  a head mount comprising a forehead length structured such that upon wearing the head mount, the forehead length extends across a forehead transversely, the forehead length connected occipitally to a circumference adjuster the head mount associated with the receiver such that, upon wearing the article and the viewer and the stereoptic display device, torque is not substantially provided by an outward force of facial pushing on a lower edge of the viewer.

16. The article of claim 15, wherein the receiver is configured to interchangeably support different types of stereoptic viewers.

17. The article of claim 15, further comprising grippers on sides of the stereoptic viewer, each said gripper intermediate the receiver and the stereoptic viewer, each said gripper configured to enable the stereoptic viewer to be adjustably positionable higher or lower, and closer or farther, with respect to the receiver, and thereafter to enable affixing the stereoptic viewer to the receiver.

18. The article of claim 15, wherein the stereoptic viewer is sized and shaped to accommodate a cellular phone as the stereoptic display device.

19. An article of manufacture to receive and suspend a stereoptic viewer, the article including:
  a receiver configured to suspend a stereoptic viewer that is detachably attached and adjustably positionable with respect to the receiver, such that upon receiving the viewer and a stereoptic display device, the receiver plus the viewer plus the display device collectively have a weight and the display device is positionable at eye level; and
  a head mount comprising a forehead length structured such that upon wearing the head mount, the forehead length extends across a forehead transversely, the forehead length connected occipitally to a circumference adjuster the head mount associated with the receiver such that, upon wearing the article and the viewer and the stereoptic display device, torque is not substantially provided by a friction force of a face or forehead in contact with the viewer or the head mount.

20. The article of claim 19, wherein the receiver is configured to interchangeably support different types of stereoptic viewers.

21. The article of claim 19, further comprising grippers on sides of the stereoptic viewer, each said gripper intermediate the receiver and the stereoptic viewer, each said gripper configured to enable the stereoptic viewer to be adjustably positionable higher or lower, and closer or farther, with respect to the receiver, and thereafter to enable affixing the stereoptic viewer to the receiver.

22. An apparatus to receive and suspend a stereoptic viewer assembly, the apparatus including:
  a receiver comprising a brace configured to receive and suspend a stereoptic viewer that is detachably attached and adjustably positionable with respect to the receiver, such that upon wearing the viewer and a stereoptic display device, the brace extends across a forehead transversely and the receiver plus the stereoptic viewer plus the stereoptic device collectively have a weight, in combination with a head mount, the head mount comprising:
  (1) means for suspending the stereoptic viewer, including a head mount comprising a forehead length structured such that upon wearing the head mount, the forehead length extends across a forehead transversely, the forehead length connected occipitally to a circumference adjuster, the head mount being associated with the receiver such that, upon wearing the article and the stereoptic viewer and the stereoptic display device, are positioned adjacent to a face, or
  (2) a head mount comprising a forehead length structured such that upon wearing the head mount, the forehead length extends across a forehead transversely, the forehead length combined with a parietal length and connected occipitally to a circumference adjuster, the head mount associated with the receiver such that, upon wearing the article and the stereoptic viewer and the stereoptic display device, the weight is essentially balanced by force on the parietal length of the head mount and torque from the weight is essentially balanced by force on the occipital length of the head mount, or (3) a head mount comprising a forehead length structured such that upon wearing the head mount, the forehead length extends across a forehead transversely, the forehead length combined with a parietal length and connected occipitally to a circumference adjuster, the head mount associated with the receiver such that the weight is essentially balanced by frictional force on the forehead length of the head mount and torque from the weight is essentially balanced by force on the occipital length of the head mount, or (4) a head mount comprising a forehead length structured such that upon wearing the head mount, the forehead length extends across a forehead transversely, the forehead length combined with a parietal length and connected occipitally to a circumference adjuster, the head mount having a second weight and being associated with the receiver such that, upon wearing the article and the stereoptic viewer and the stereoptic display device, torque from the first weight is primarily countervailed by torque from the second weight and tension of the head mount, or (5) a head mount comprising a forehead length structured such that upon wearing the head mount, the forehead length extends across a forehead transversely, the forehead length combined with a parietal length and connected occipitally to a circumference adjuster, the head mount being associated with the receiver such that, upon wearing the article and the stereoptic viewer and the stereoptic display device, torque is not substantially provided by an outward force of a face pushing on a lower edge of the stereoptic viewer, or (6) a head mount comprising a forehead length structured such that upon wearing the head mount, the forehead length extends across a forehead transversely, the forehead length connected occipitally to a circumference adjuster, the head mount being associated with the receiver such that, upon wearing the article and the viewer and the stereoptic display device, torque is not substantially provided by a friction force of a face or forehead in contact with the stereoptic viewer or the head mount.

23. The apparatus of claim 22, wherein the receiver is configured to interchangeably support different types of stereoptic viewers, and one of the types of stereoptic viewers is sized and shaped to accommodate a cellular phone as the stereoptic display device.

24. The process of claim 4, wherein the combining is carried out with the stereoptic viewer sized and shaped to accommodate a cellular phone as the stereoptic display device.

25. A product produced by the process of claim 4.

26. A process of using a viewer support system to receive and suspend a stereoptic viewer assembly, the method including:

combining a receiver shaped to receive and suspend a stereoptic viewer that is detachably attached and adjustably positionable with respect to the receiver, the combining including adjusting stereoscopic viewer with respect to the receiver, wherein the receiver plus the stereoptic viewer plus the stereoptic display device collectively have a weight in balance with a head mount comprising:

(1) means for suspending the stereoptic viewer including a head mount comprising a forehead length structured such that upon wearing the head mount, the forehead length extends across a forehead transversely, the forehead length connected occipitally to a circumference adjuster, the head mount being associated with the receiver such that, upon wearing the article and the stereoptic viewer and the stereoptic display device, are positioned adjacent to a face, or (2) a head mount comprising a forehead length comprising a forehead length structured such that upon wearing the head mount, the forehead length extends across a forehead transversely, the forehead length combined with a parietal length and connected occipitally to a circumference adjuster, the head mount associated with the receiver such that, upon wearing the article and the stereoptic viewer and the stereoptic display device, the weight is essentially balanced by force on the parietal length of the head mount and torque from the weight is essentially balanced by force on the occipital length of the head mount, or (3) a head mount comprising a forehead length comprising a forehead length structured such that upon wearing the head mount, the forehead length extends across a forehead transversely, the forehead length combined with a parietal length and connected occipitally to a circumference adjuster, the head mount associated with the receiver such that the weight is essentially balanced by frictional force on the forehead length of the head mount and torque from the weight is essentially balanced by force on the occipital length of the head mount, or (4) a head mount comprising a forehead length comprising a forehead length structured such that upon wearing the head mount, the forehead length extends across a forehead transversely, the forehead length combined with a parietal length and connected occipitally to a circumference adjuster, the head mount having a second weight and being associated with the receiver such that, upon wearing the article and the viewer and the stereoptic display device, torque from the first weight is primarily countervailed by torque from the second weight and tension of the head mount, or (5) a head mount comprising a forehead length comprising a forehead length structured such that upon wearing the head mount, the forehead length extends across a forehead transversely, the forehead length combined with a parietal length and connected occipitally to a circumference adjuster, the head mount being associated with the receiver such that, upon wearing the article and the viewer and the stereoptic display device, torque is not substantially provided by an outward force of a face pushing on a lower edge of the stereoptic viewer, or (6) a head mount comprising a forehead length comprising a forehead length structured such that upon wearing the head mount, the forehead length extends across a forehead transversely, the forehead length connected occipitally to a circumference adjuster, the head mount being associated with the receiver such that, upon wearing the article and the stereoptic viewer and the stereoptic display device, torque is not substantially provided by a friction force of a face or forehead in contact with the viewer or the head mount, and with a stereoptic viewer adapted to be suspended by the receiver so as to produce a combination of the receiver, the head mount, and the stereoptic viewer.

27. The process of claim 26, wherein the combining is carried out with the stereoptic viewer sized and shaped to accommodate a cellular phone as the stereoptic display device.

* * * * *